(12) United States Patent
Choi et al.

(10) Patent No.: US 7,731,850 B2
(45) Date of Patent: Jun. 8, 2010

(54) APPARATUS AND METHOD FOR TREATING WASTEWATER

(75) Inventors: Hong-Bok Choi, Seoul (KR); Jae-Ki Lee, Seoul (KR); Ju-Hyung Park, Seoul (KR); Eun-Ju Choi, Seoul (KR); Jeong-Rae Kim, Seoul (KR)

(73) Assignee: EcoDays Co. Ltd., Seoul (KR)

( * ) Notice: Subject to any disclaimer, the term of this patent is extended or adjusted under 35 U.S.C. 154(b) by 73 days.

(21) Appl. No.: 11/753,641

(22) Filed: May 25, 2007

(65) Prior Publication Data

US 2007/0289921 A1      Dec. 20, 2007

(30) Foreign Application Priority Data

May 26, 2006   (KR)   ............... 10-2006-0047713

(51) Int. Cl.
*C02F 3/30*   (2006.01)
(52) U.S. Cl. .................. 210/603; 210/605; 210/612
(58) Field of Classification Search ............ 210/603, 210/606, 608, 612, 613, 615, 630, 631, 605
See application file for complete search history.

(56) References Cited

U.S. PATENT DOCUMENTS 3,930,998 A * 1/1976 Knopp et al. ............. 210/609

| | | | |
|---|---|---|---|
| 4,173,534 A | | 11/1979 | Kelly |
| 4,246,099 A | * | 1/1981 | Gould et al. ............. 210/603 |
| 5,141,646 A | * | 8/1992 | Rozich ................. 210/613 |
| 5,492,624 A | | 2/1996 | Rozich |
| 6,723,242 B1 | * | 4/2004 | Ohkata et al. ............ 210/601 |
| 2002/0104798 A1 | * | 8/2002 | Takechi et al. ........... 210/605 |
| 2005/0109697 A1 | | 5/2005 | Olivier |

FOREIGN PATENT DOCUMENTS

KR     20-0364601 Y1     10/2004
KR     10-0470925 A      3/2005

* cited by examiner

*Primary Examiner*—Fred Prince
(74) *Attorney, Agent, or Firm*—Kelleher IP, PLLC; Sean Liam Kelleher

(57) ABSTRACT

An apparatus and method for treating wastewater are provided. The method for treating wastewater includes: a pretreatment step of removing impurities contained in high concentration wastewater and crushing the impurities using a crusher; a first aerobic treatment step of supplying wastewater containing organic acids to a first aerobic tank and injecting air to the first aerobic tank to be aerobically treated; an anaerobic treatment step of supplying the wastewater, from which excess organic acids are removed by the aerobic treatment, to an anaerobic tank to be anaerobically treated; a degassing step of supplying the wastewater treated in the aerobic and anaerobic treatment steps to a degassing tank to remove air and gas; and a post-treatment step of precipitating the wastewater aerobically treated using a solid-liquid separation tank, a pressure floatation tank or a precipitation tank.

13 Claims, 12 Drawing Sheets

APPARATUS AND METHOD FOR TREATING WASTEWATER

CROSS-REFERENCE TO RELATED APPLICATION

This application claims the benefit of Korean Patent Application No. 10-2006-0047713, filed on May 26, 2006, the entire disclosure of which is hereby incorporated by reference.

BACKGROUND OF THE INVENTION

1. Field of the Invention

The present invention relates to an apparatus and method for treating wastewater and, more particularly, to a method for effectively treating wastewater of high concentration by sequentially performing an aerobic treatment and an anaerobic treatment, and an apparatus therefor.

2. Description of Related Art

In general, while high concentration wastewater can be completely treated by an aerobic treatment, an anaerobic digestion process has been further used to increase the utility of methane gas.

However, the efficiency of the anaerobic digestion is very low due to various problems such as a pH decrease and an inflow of irregular pollutant loads caused as organic pollutants of the high concentration wastewater are degraded at high rates. Especially, in case of the Korean Peninsula, since the components and degradation degrees of food waste, livestock waste, sewage sludge, etc. containing organic components of high concentration are diversified and the four seasons are clear, the load changes and the temperature load changes may be shown variously. Accordingly, specific reactors and an arrangement of such reactors are required to adapt readily to such circumstances.

A typical method for meeting with the above requirements is an upflow anaerobic sludge blanket (UASB).

However, the UASB has shown limitations in the efficiency due to some problems in a mixing process, a supply of microorganisms, an increase in size of an apparatus, an approach to a plug flow reactor (PFR), an approach to a rapid oxidation, and the like.

The most significant problem of existing anaerobic treatments is the wastewater treatment after the anaerobic treatment. Since the wastewater contains high concentration organic pollutants and ammonia, it is very difficult to appropriately treat the wastewater using the existing aerobic treatment method. That is, since the concentration of organic pollutants is very high and the organic pollutants are non-degradable, the treatment period is usually long and an ammonia stripping process by increasing pH is required, thus resulting in high cost in the post-treatment.

SUMMARY OF THE INVENTION

The present invention has been made in an effort to solve the above-described problems, and an object of the present invention is to provide a method for effectively treating wastewater of high concentration by sequentially performing an aerobic treatment and an anaerobic treatment, and an apparatus therefor.

In an aspect, the present invention provides a method for treating wastewater comprising: a pre-treatment step of removing impurities contained in high concentration wastewater and crushing the impurities using a crusher; a first aerobic treatment step of supplying wastewater containing organic acids to a first aerobic tank and injecting air to the first aerobic tank to be aerobically treated; an anaerobic treatment step of supplying the wastewater, from which excess organic acids are removed by the aerobic treatment, to an anaerobic tank to be anaerobically treated; a degassing step of supplying the wastewater treated in the aerobic and anaerobic treatment steps to a degassing tank to remove air and gas; and a post-treatment step of precipitating the wastewater aerobically treated using a solid-liquid separation tank, a pressure floatation tank or a precipitation tank.

BRIEF DESCRIPTION OF THE DRAWINGS

The above and other features of the present invention will be described with reference to certain exemplary embodiments thereof illustrated the attached drawings in which.

DETAILED DESCRIPTION OF THE INVENTION

Hereinafter, an apparatus and method for treating wastewater in accordance with preferred embodiments of the present invention will be described with reference to the accompanying drawings.

Figure 1:
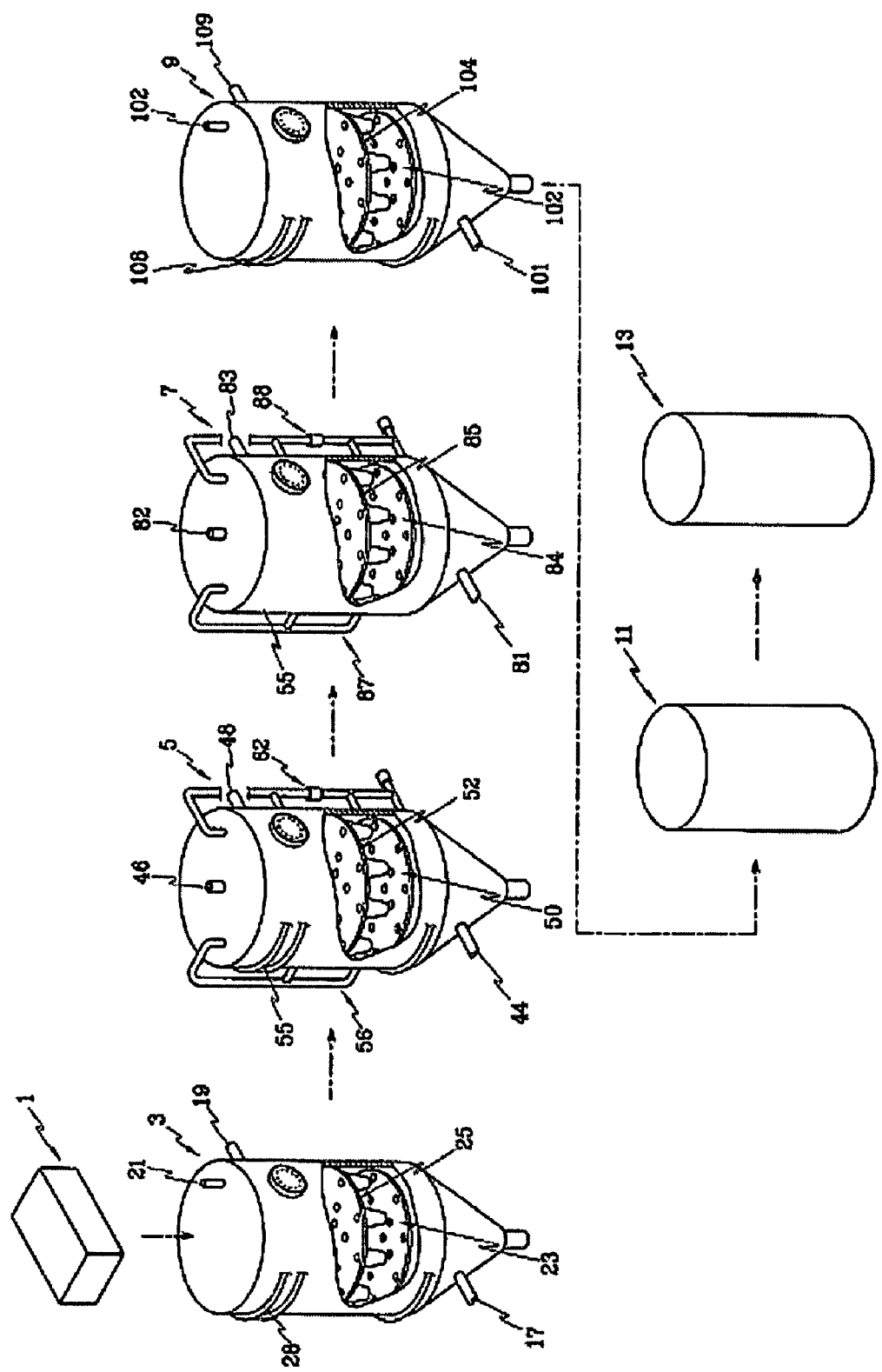
FIG. 1 a process diagram depicting a method for treating wastewater in accordance with a preferred embodiment of the present invention.
Figure 2:
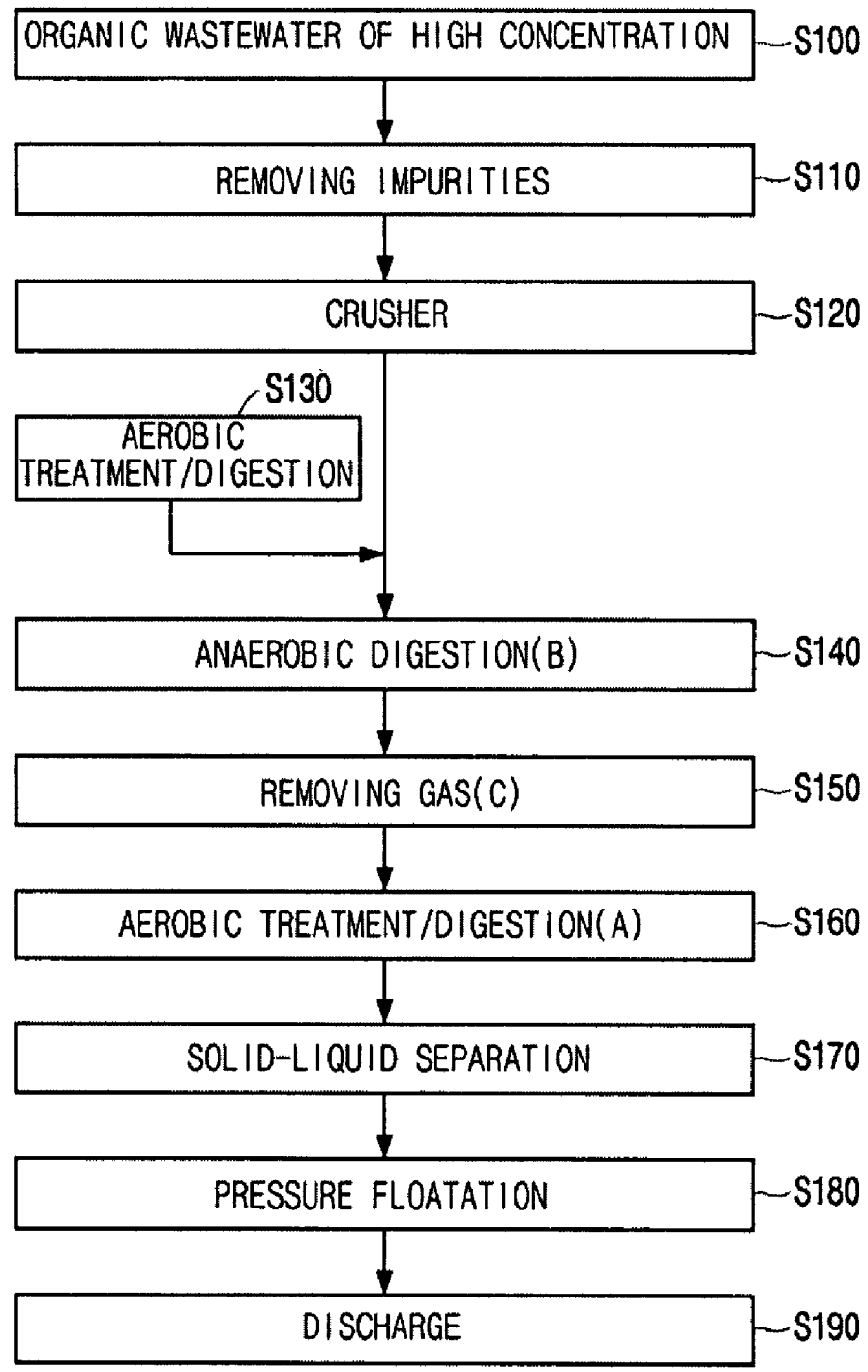
FIG. 2 is a flowchart illustrating the processing order of the method for treating wastewater depicted in FIG. 1.

FIG. 1 a process diagram depicting a method for treating wastewater in accordance with a preferred embodiment of the present invention, and FIG. 2 is a flowchart illustrating the processing order of the method for treating wastewater depicted in FIG. 1.

As depicted in the figures, a method for treating wastewater provided by the present invention comprises pre-treatment steps (S100, S110 and S120) of removing and crushing impurities contained in wastewater of high concentration, a first aerobic treatment step (S130) of supplying air to wastewater containing organic acids such as foods and the like, an anaerobic treatment step (S140) of anaerobically treating wastewater from which excess organic acids are removed by the aerobic treatment, a degassing step (S150) of removing air and gas from the wastewater treated in the aerobic and anaerobic treatment steps, a second aerobic treatment step (S160) of treating the degassed wastewater, and post-treatment steps (S170, S180 and S190) of performing a solid-liquid separation process and a pressure floatation for the aerobically treated wastewater.

In the pre-treatment steps (S100, S110 and S120) according to the method for treating wastewater, impurities contained in high concentration wastewater are removed and the resulting wastewater is supplied to a crusher 1 to additionally remove solid substances. At this time, it is possible to remove solid substances contained in wastewater using a solid-liquid separator (not depicted), instead of the crusher 1.

Like this, the pre-treated wastewater is supplied to a first aerobic tank 3 to be subjected to the first aerobic treatment step (S130).

Figure 3A:
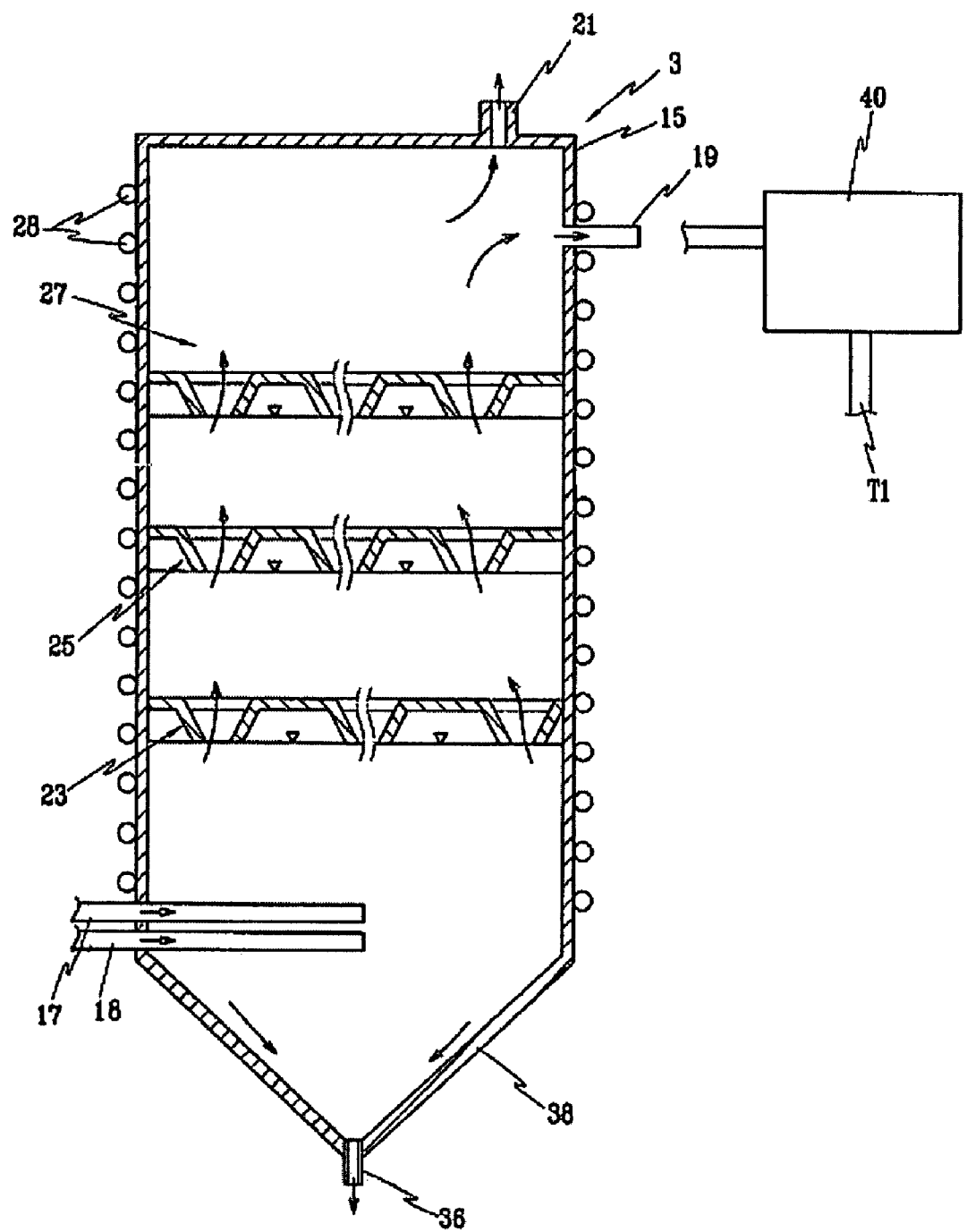
FIG. 3a is a side view of a first aerobic tank depicted in FIG. 1.

That is, as depicted in FIGS. 1 and 3a, the first aerobic tank 3, in which the first aerobic treatment step (S130) is carried out, comprises a reactor 15 into which wastewater and air are introduced, an inlet pipe 17 through which wastewater flows in the reactor 15, sludge separating means 23, 25 and 27 transferring the introduced wastewater and bubbles upward in the order of concentration by dividing the inside of the reactor 14 into up and down multi-stages, and separating pollutants by concentrations by increasing the contact area between the wastewater and bubbles to increase the dissolved oxygen concentration, and an air outlet 21 through which the bubbles passing through the sludge separating means 23, 25 and 27 are discharged to the outside.

Moreover, the first aerobic tank 3 further comprises a treated water outlet 19, mounted on the reactor 15, for discharging the wastewater treated by passing through the sludge separating means 23, 25 and 27, a diffuser 18, mounted on the lower portion of the reactor 15, for supplying air, and a settling tank 38, provided on the lower portion of the reactor 15, for concentrating and discharging the precipitated sludge.

In the first aerobic tank 3 having the above-described structure, the reactor 15 has a cylindrical shape in which wastewater and air are stored.

The inlet pipe 17 is provided on the lower portion of the reactor 15 to supply wastewater to the inside of the reactor 15.

Accordingly, the wastewater introduced into the inside of the reactor 15 through the inlet pipe 17 is filled from the bottom of the reactor 15 and sludge having a weight of more than a certain degree contained in the wastewater is settled in the settling tank 38.

The diffuser 18 is connected to a ventilator (not depicted) provided in the outside of the reactor 15 to supply air to the reactor 15.

Accordingly, the air supplied to the reactor 15 by the diffuser 18 is uniformly injected into the wastewater and thereby the wastewater is purified by microorganisms thanks to the supplied air.

At least one of the sludge separating means 23, 25 and 27 is provided in the inside of the reactor 15 to divide the reactor 15 in multi-stages.

Accordingly, the air introduced through the diffuser 18 passes through the plural sludge separating means 23, 25 and 27 while ascending through the wastewater, thus allowing the microorganisms to purify the stored wastewater.

Such sludge separating means 23, 25 and 27 comprises at least one sludge separating means, preferably, first to third sludge separating means 23, 25 and 27.

Since the first to third sludge separating means 23, 25 and 27 have the same shape, the description will be made with respect to the first sludge separating means 23.

Figure 4:
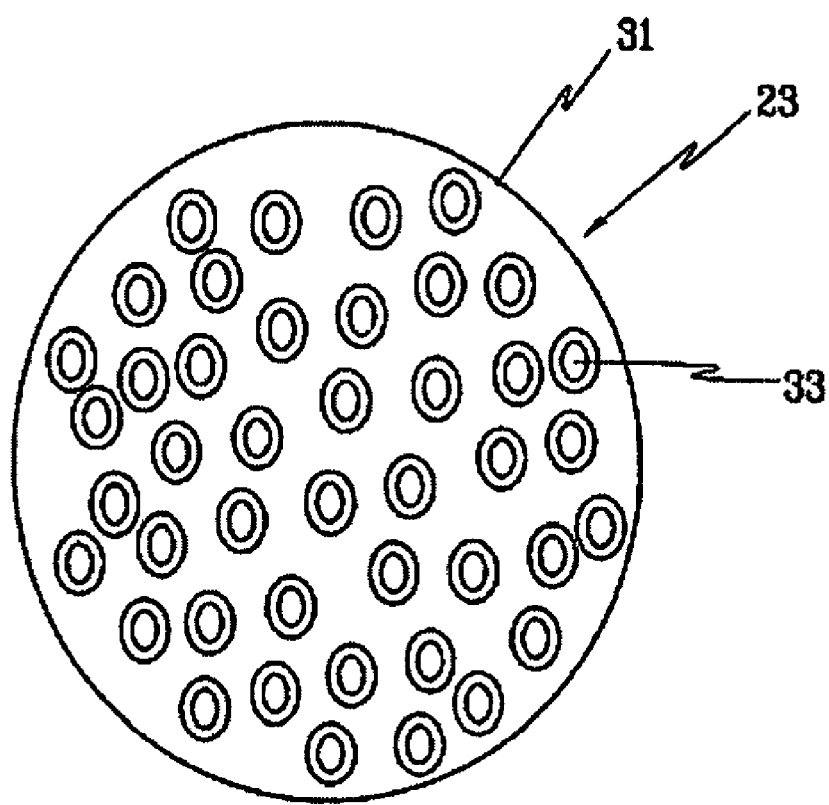
FIG. 4 is a plan view of sludge separating means depicted in FIG. 1.
Figure 5:
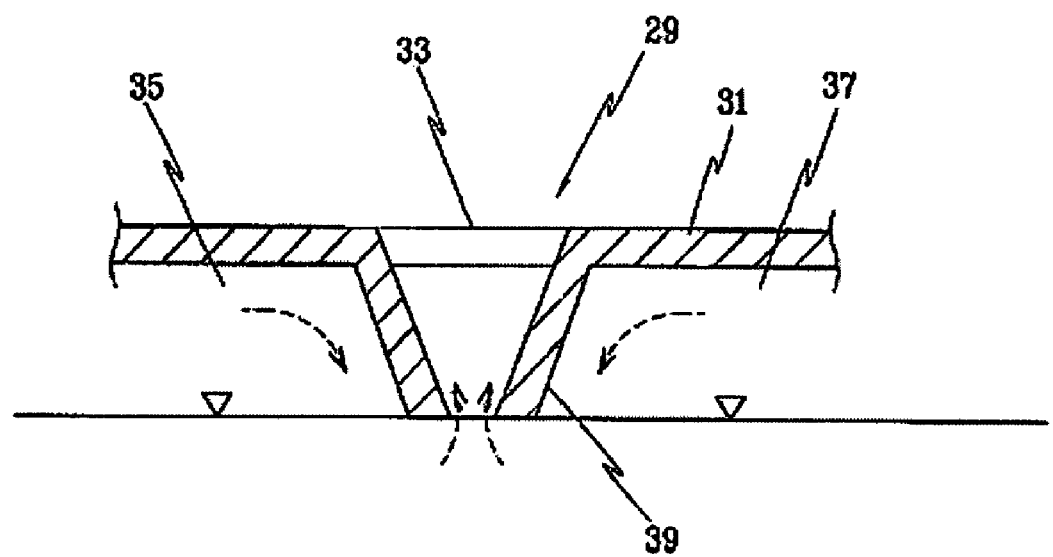
FIG. 5 is a side view of FIG. 4.

As depicted in FIGS. 3a, 4 and 5, the sludge separating means 23 divides the inside of the reactor 15 into up and down regions and includes a plate 31, on which a plurality of through-holes 33 is formed, and a plurality of fluid transfer pipes 39, protruding downward from the bottom of the plate 31, through which wastewater and air pass.

In the sludge separation means having the above-described structure, it is desirable that the plurality of through-holes 33 be uniformly distributed on the plate 31.

Moreover, the plurality of the fluid transfer pipes 39 has a cylindrical shape connected to the through-holes 33 and, preferably, has a funnel shape of which the upper area is greater in diameter than the lower area.

Accordingly, the wastewater and air introduced into the fluid transfer pipes 39 are transferred upward with ascending current fluids and, during this process, the air is dissolved sufficiently in the wastewater, thus enabling the aerobic treatment.

Furthermore, the solid substances contained in wastewater are settled down with descending current fluids and thereby high-concentration sludge is settled in the lower portion of the sludge separation means to be divided according to their concentrations.

The plurality of the fluid transfer pipes 39 are formed protruding to the lower portion of the plate 31 in a predetermined length and thereby a plurality of staying spaces 35 and 37 surrounded by the fluid transfer pipes 39 is formed beneath the plate 31.

Here, the lower surface of the fluid transfer pipe 39 is not limited to the shape depicted in the figures, but may has an irregular shape such as a jagged shape in order to facilitate the transfer of air. Accordingly, the air ascending from the lower portion of the reactor 15 is collected in the staying spaces 35 and 37 and then dispersed in all directions by pressure to be transferred to the upper space of the reactor 15 through the fluid transfer pipes 39.

Although the shape of the fluid transfer pipes 39 is preferably limited to the funnel shape of which the upper area is greater in diameter than the lower area, the present invention is not limited thereto, but it is possible to form the fluid transfer pipes 39 in a shape of which the upper area is smaller than the upper area, or in a shape of which the upper and lower areas are the same.

Moreover, an air outlet 21 is provided on the upper portion of the reactor 15 to discharge air collected in the uppermost portion of the reactor 15 to the outside.

Furthermore, a solid outlet 36 is provided on the lower portion of the settling tank 38 formed on the bottom of the reactor 15 so that the solid substances settled down in the aerobic treatment are discharged through the solid outlet 36 in every predetermined period.

A treated water outlet 19 is mounted on the lateral surface of the reactor 15 so that the aerobically treated wastewater is discharged through the treated water outlet 19 to the outside and, preferably, into a storing tank 40.

Moreover, a heat exchanger 38 is arranged on the outer surface of the reactor 15. In general, the microorganisms generate heat during the aerobic treatment in the reactor 15. Accordingly, the heat generated by the microorganisms is transferred to circulate water flowing in the heat exchanger 38.

Furthermore, a heat exchange pump (not depicted) may be provided on one side of the heat exchanger 28 to supply the circulating water of the first aerobic tank 3 to the anaerobic tank 5, on the contrary, to supply the circulating water of the aerobic tank 5 to the first aerobic tank 3.

As described above, the wastewater is stored in the reactor 15 and the introduced oxygen ascends in the form of bubbles to pass through the plural sludge separating means 23, 25 and 27. During this process, the sludges are separated according to their concentrations to increase the concentration of organic pollutants as much as going to the bottom of the reactor 15. Moreover, the dissolved oxygen concentration in wastewater is increased as the ascending bubbles stay for a certain time.

Moreover, at least one entrance for maintenance and repair of the reactor 15 is provided on the wall of the reactor 15 so that a worker can enter the reactor 15 for the maintenance and repair of the reactor 15.

Next, the first aerobic treatment step (S130) will be described in more detail as follows. First, wastewater to be treated is introduced into the reactor 15 through the inlet pipe 17 and filled from the bottom thereof gradually. Moreover, external air is drawn into the reactor 15 through the diffuser 18.

The air injected through the diffuser 18 ascends in the form of fine bubbles to reach the first sludge separating means 23.

The fine bubbles reached to the first sludge separating means 23 ascend to the upper space through the fluid transfer pipes 39 and the air ascend by buoyancy to be collected in the staying spaces 35 and 37 formed beneath the plate 31.

At this time, the staying spaces 35 and 37 are formed on the upper portion of the lowermost region of the fluid transfer pipes 39 protruding downward. Accordingly, the level of wastewater is formed on a straight line connecting the lowermost region of the fluid transfer pipes 39.

Moreover, since the starting point that the substances existing in the lower portion of the reactor 15 move upward is the lowermost region of the fluid transfer pipes 39, the highest density substance in the bubbles and air and the lowest density substance in the wastewater are selected by buoyancy to be transferred upward.

At this time, since the fluid transfer pipes 39 have a shape of which the upper area and the lower area are different from each other, the wastewater and air are moved upward with ascending current fluids to disperse the air and thereby the adjacent sludges are settled down with descending current fluids.

As a result, high concentration sludges are settled in the lower portion and thereby the sludges are divided according to their concentrations.

With such structural features, most bubbles generated in the reactor 15 stay in the upper end of the level of wastewater and, in this process, the dissolved oxygen concentration is increased as the ascending time is delayed, Moreover, substances of relatively lower concentration prevail on the level of wastewater by surface tension.

Accordingly, since substances of low concentration are positioned on the upper portions in the respective stages and, consequently, substance separation is made in which the substance concentrations are lowered as going to the upper portion of the reactor 15. Moreover, the amount of air introduced from the bottom and its pressure are set to more than predetermined values so as to be uniformly discharged through the respective fluid transfer pipes 39.

Through such processes, the wastewater and air passing through the first sludge separating means 23 reach the second sludge separating means 25 and, while passing through the second sludge separating means 25, the substance separation is also made via the same process as the first sludge separating means 23.

Moreover, the dissolved oxygen concentration is increased and the substance separation according to the concentration is made via the same process of the first and second sludge separating means 23 and 25, and thereby the sludge is settled down.

The thus treated wastewater is discharged to the outside through a gas outlet 21.

In the first aerobic treatment step (S130) as described above, since relatively high density materials (microorganisms) in the wastewater can be detained in the bottom of the reactor, it is possible to ensure the microorganisms in the reactor. Moreover, it is possible to maximize vapor-liquid contact efficiency and mixing efficiency by increasing the fluidity. Furthermore, it is possible to effectively use the reaction heat generated by the rapid growth of microorganisms in the reactor.

Meanwhile, as described above, the wastewater aerobically treated in the first aerobic tank 3 is stored in the first storing tank 40 in FIG. 3*a* and supplied to the anaerobic tank 5 through a first supply pipe T1 in FIG. 3*a* to be subjected to the anaerobic treatment step (S140).

Figure 3B:
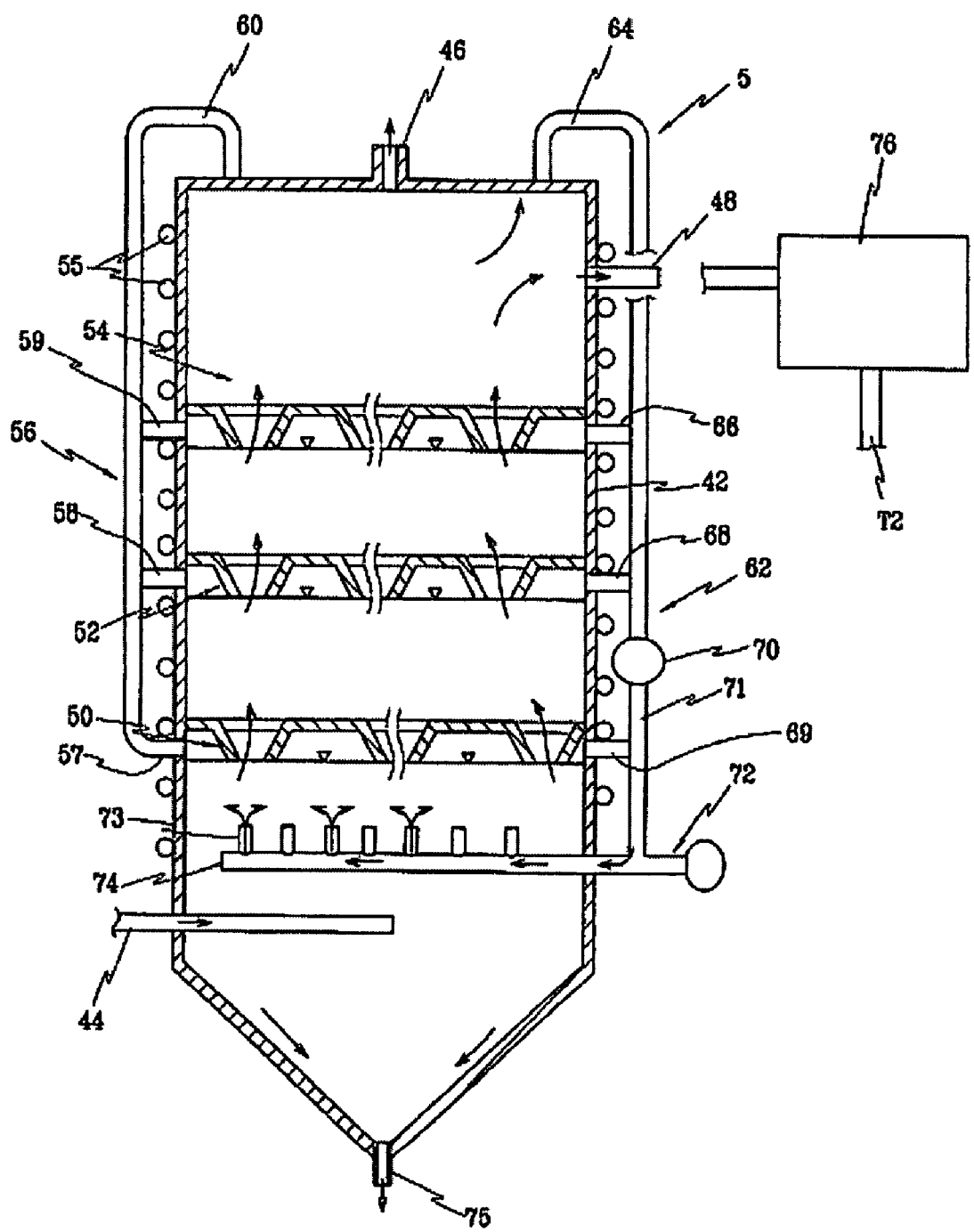
FIG. 3b is a side view of an anaerobic tank depicted in FIG. 1.

That is, the anaerobic treatment step (S140) is performed in the anaerobic tank 5, and the anaerobic tank 5 has a structure similar to the first aerobic tank 3 as depicted in FIGS. 1 and 3*b*. Simply, the anaerobic tank 5 has a difference in that first and second gas transfer pipes 56 and 62 are provided in a reactor 42. Accordingly, a detailed description of the same elements as the first aerobic tank 3 will be omitted.

Like the aerobic tank 3, the anaerobic tank 5 comprises a reactor 42 into which wastewater and air are introduced, an inlet pipe 44 through which wastewater flows in the reactor 42, sludge separating means 50, 52 and 54 dividing the inside of the reactor 42 into up and down multi-stages and carrying out an anaerobic treatment for the wastewater, a gas outlet 46, mounted on the upper portion of the reactor 42, through which bubbles passing through the sludge separating means 50, 52 and 54 are discharged to the outside of the reactor 42, and a heat exchanger 55 arranged on the outer surface of the reactor 42.

Moreover, the anaerobic tank 5 further comprises a treated water outlet 48, mounted on the reactor 42, for discharging the wastewater treated by passing through the sludge separating means 50, 52 and 54, and an outlet 75, provided on the lower portion of the reactor 42, for concentrating and discharging the precipitated sludge to the outside.

Accordingly, the wastewater and air introduced into the reactor 42 are anaerobically treated while ascending to pass through the plural sludge separating means 50, 52 and 54 in the sequential order.

Here, the gas outlet 46 discharges gas below the water level to collect generated gas after an anaerobic digestion process.

The first and second gas transfer pipes 56 and 62 provided on both sides of the reactor 42 circulate the gas collected in the respective stages of the reactor 42 to the lower portion of the reactor 42 again so as to introduce wastewater into the space from which the gas is discharged, thus creating a stirring effect in the respective stages.

Describing in more detail, the first gas transfer pipe 56 comprises a first main pipe 60 through which gas can be transferred, and first auxiliary pipes 57, 58 and 59 protruding from the first main pipe 60 to the inside of the reactor 42 and connected to staying spaces 35 and 37 of the respective sludge separating means 50, 52 and 54.

Accordingly, the collected gas is transferred to the respective first auxiliary pipes and circulated to the lower portion of the reactor 42 through the main pipe 60, thus ensuring the stirring effect of the respective stages and the anaerobic digestion process.

Moreover, the second gas transfer pipe 62 has a structure similar to the first gas transfer pipe 56 to circulate gas up and down. That is, the second gas transfer pipe 62 comprises a second main pipe 64 through which gas can be transferred, second auxiliary pipes 66, 68 and 69 protruding from the second main pipe 64 to the inside of the reactor 42 and connected to staying spaces 35 and 37 of the respective sludge separating means 50, 52 and 54, and a pump 70 forcing the gas to circulate.

Accordingly, the gas discharged from the respective second auxiliary pipes 66, 68 and 69 may be circulated to the lower portion of the reactor 42 through the second main pipe 64 or circulated to the upper portion when the pump 70 is driven. Here, a valve (not depicted) may be provided at a predetermined position of the second main pipe 64 to prevent the wastewater from flowing backward.

A lower end portion 72 of the second main pipe 64 extends into the reactor 42 through the lower portion of the reactor 42.

The lower end portion 72 comprises an air inlet pipe 74 through which air is introduced, and a plurality of nozzles 73 arranged on the surface of the air inlet pipe 74 to uniformly inject air.

Accordingly, air and gas are injected into the reactor 42 through the lower end portion 72 and the injected air and gas ascend to pass through the sludge separating means 50, 52 and 54 in the sequential order, thus being subjected to the anaerobic treatment.

The wastewater treated as described above is stored in a second storing tank 76 and supplied to a degassing tank 7 to be subjected to the degassing process (S150).

Figure 3C:
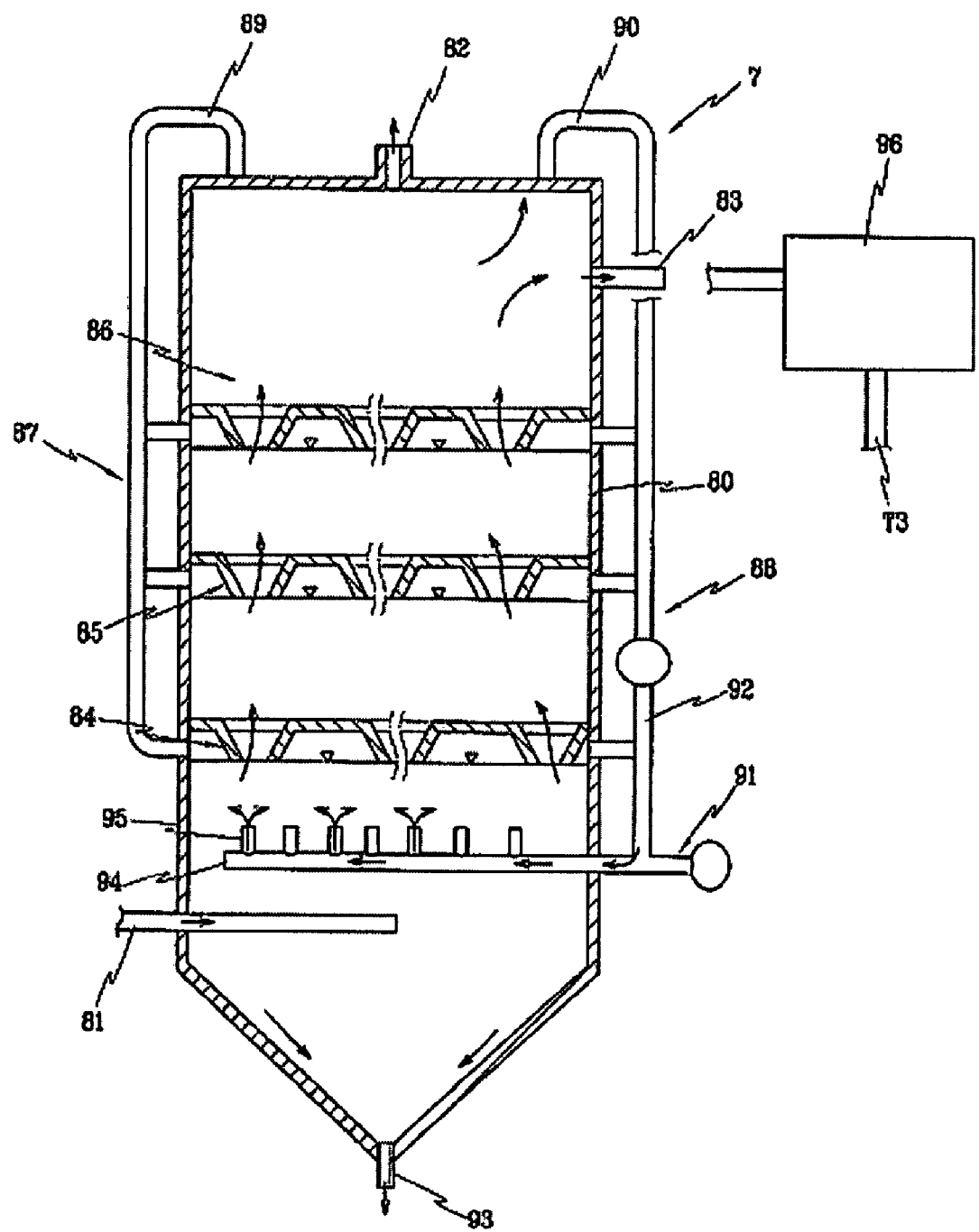
FIG. 3c is a side view of a degassing tank depicted in FIG. 1.

As depicted in FIGS. 1 and 3c, the degassing process (S150) is carried out in the degassing tank 7. The degassing tank 7 has a structure similar to the anaerobic tank 5 and merely has a difference in that the heat exchanger is eliminated in a reactor 80. Accordingly, a detailed description of the same elements as the first aerobic tank 3 will be omitted.

The degassing tank 7 comprises a reactor 80 into which wastewater and air are introduced, an inlet pipe 81 through which wastewater flows in the reactor 80, sludge separating means 84, 85 and 86 dividing the inside of the reactor 80 into up and down multi-stages and carrying out an anaerobic treatment for the wastewater, and a gas outlet 82, mounted on the upper portion of the reactor 80, through which bubbles passing through the sludge separating means 84, 85 and 86 are discharged to the outside of the reactor 80.

Moreover, the degassing tank 7 further comprises a treated water outlet 83, mounted on the reactor 80, for discharging the wastewater treated by passing through the sludge separating means 84, 85 and 86, a diffuser 91, mounted on the lower portion of the reactor 80, for supplying air, and an outlet 93, provided on the lower portion of the reactor 80, for concentrating and discharging the precipitated sludge to the outside.

Accordingly, the wastewater and air introduced into the reactor 80 are anaerobically treated while ascending to pass through the plural sludge separating means 84, 85 and 86 in the sequential order.

Here, the gas outlet 82 discharges gas below the water level to collect generated gas.

Moreover, first and second gas transfer pipes 89 and 90 provided on both sides of the reactor 80 circulate the collected gas in the respective stages of the reactor 80 to the lower portion of the reactor 80 again so as to introduce wastewater into the space from which the gas is discharged, thus creating a stirring effect in the respective stages.

Here, a valve (not depicted) may be provided at a predetermined position of the first and second gas transfer pipes 89 and 90 to prevent the wastewater from flowing backward. Since the first gas transfer pipe 89 has the same structure as the first gas transfer pipe 56 of the anaerobic tank 5, a detailed description will be omitted.

Meanwhile, the first and second gas transfer pipes 89 and 90 may comprises a solenoid valve to be opened and closed, respectively. Accordingly, since it is possible to selectively discharge the degassed gas and the thus discharged gas may be exhausted to the outside by hydraulic head differences, it is thus possible to destroy bubbles of the upper portion of the reactor 80.

The lower end portion of the reactor 80 may be connected to the diffuser 91 so that the degassed gas is mixed with air to be supplied to the lower portion of the reactor 80.

The diffuser 91 comprises an air inlet pipe 94 through which air is introduced, and a plurality of nozzles 95 arranged on the surface of the air inlet pipe 94 to uniformly inject air.

Accordingly, air and gas are injected into the lower portion of the reactor 80 through the diffuser 91 and the injected air and gas are collected and discharged to the outside while ascending to pass through the sludge separating means 84, 85 and 86 in the sequential order, thus being subjected to the degassing process (S150).

The degassed wastewater as described above is stored in a third storing tank 96 and supplied to a second aerobic tank 9 to be subjected to the second aerobic treatment (S160).

Figure 3D:
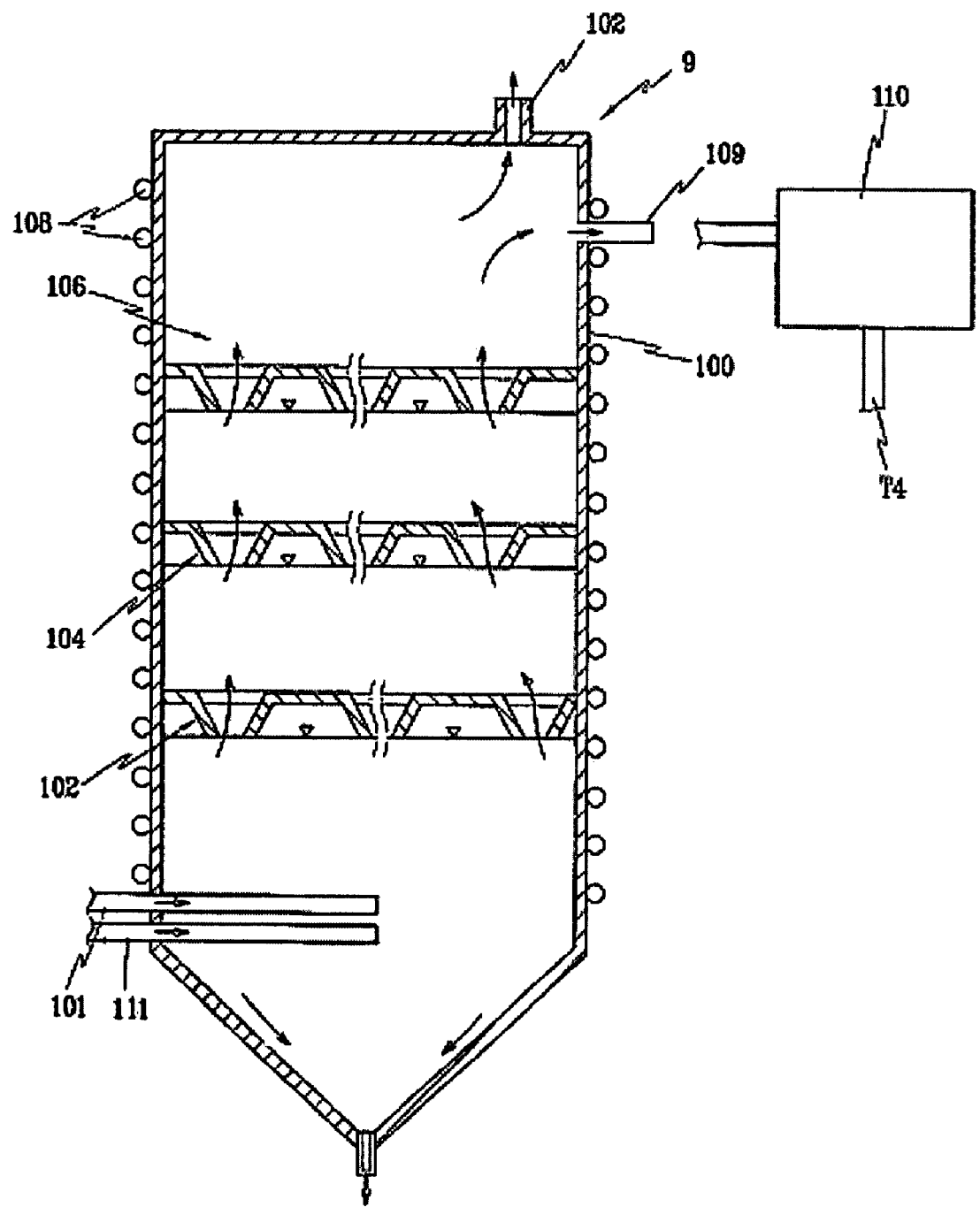
FIG. 3d is a side view of a second aerobic tank depicted in FIG. 1.

As depicted in FIGS. 1 and 3d, the second aerobic treatment step (S160) is carried out in the second aerobic tank 9. Since the second aerobic tank 9 has the same as the first aerobic tank 3, a detailed description of the repeated elements will be omitted.

The second aerobic tank 9 comprises a reactor 100 into which wastewater and air are introduced, an inlet pipe 101 through which wastewater flows in the reactor 100, sludge separating means 102, 104 and 106 dividing the inside of the reactor 100 into up and down multi-stages, an air outlet 102, mounted on the upper portion of the reactor 100, through which bubbles passing through the sludge separating means 102, 104 and 106 are discharged to the outside of the reactor 100, and a heat exchanger 108 arranged on the outer surface of the reactor 100.

Moreover, the second aerobic tank 9 further comprises a treated water outlet 109, mounted on the reactor 100, for discharging the wastewater treated by passing through the sludge separating means 102, 104 and 106, a diffuser 111, mounted on the lower portion of the reactor 100, for supplying air, and a settling tank 112, provided on the lower portion of the reactor 100, for concentrating and discharging the precipitated sludge.

As described above, after the second aerobic treatment step (S130), the post-treatment steps (S170, S180 and S190) of a solid-liquid separation process and a pressure floatation process for the aerobically treated wastewater are performed.

That is, as depicted in FIG. 1, the solid-liquid separation process in the post-treatment steps (S170, S180 and S190) may be carried out by a solid-liquid separation tank 11 having an ordinary structure. After separating solids from wastewater using the solid-liquid separation process, bubbles contained in wastewater are removed using a pressure floatation tank 13.

It is possible to discharge the treated water purified through the above-described processes to the outside.

Meanwhile, the respective processes of the present invention may be flexibly established. That is, the initial influent may be introduced into an anaerobic digestion tank, not passing through the aerobic treatment, and the solid-liquid separation process may be alternatively performed between the anaerobic treatment step (S140) and the degassing process (S150) or after the second aerobic treatment step (S160).

Moreover, a precipitation separation process by a precipitation tank 200 may be applied as an alternative process.

Figure 6:
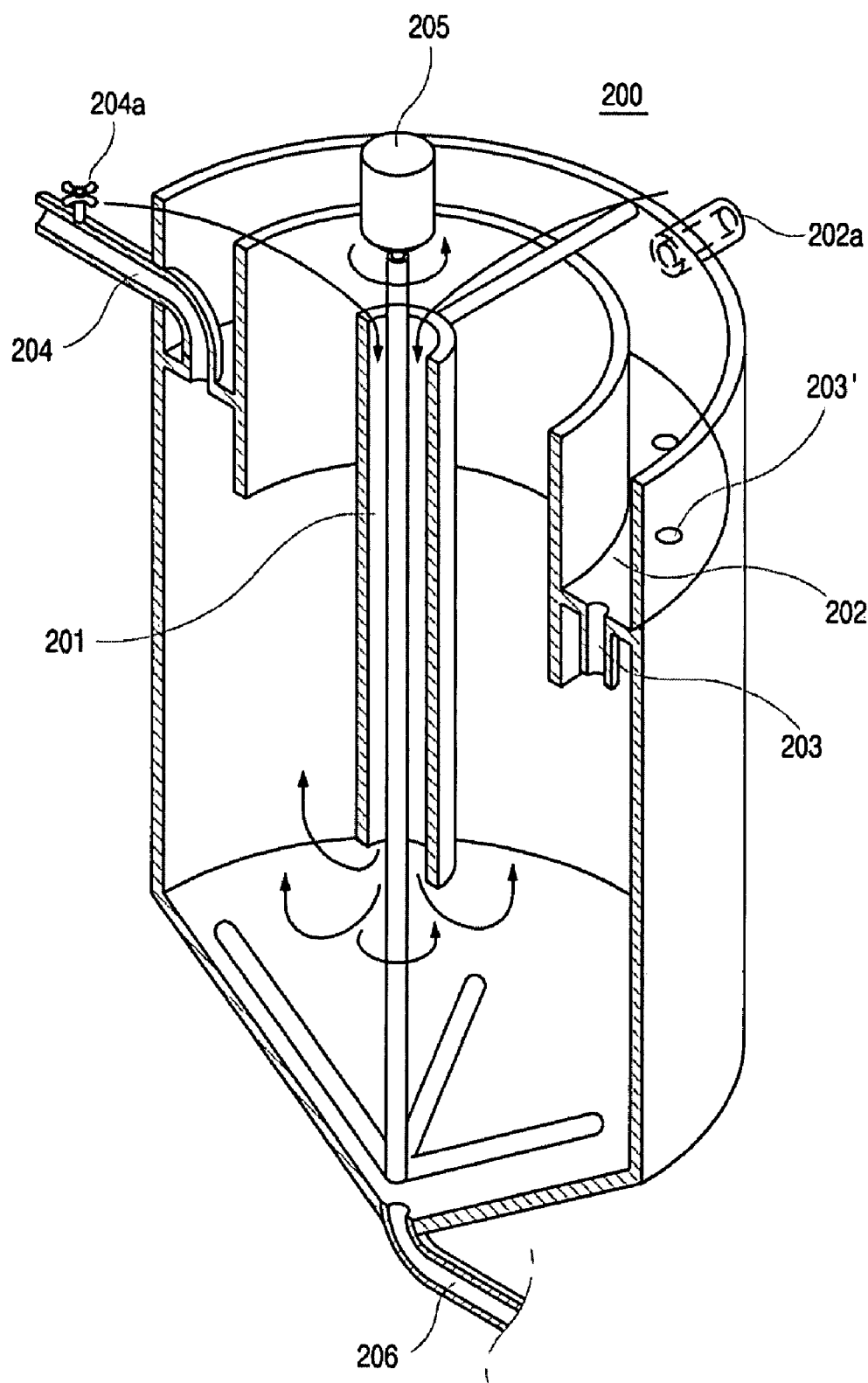
FIG. 6 is a cross sectional perspective view of a precipitation tank applied to a precipitation separation process of the present invention.
Figure 7:
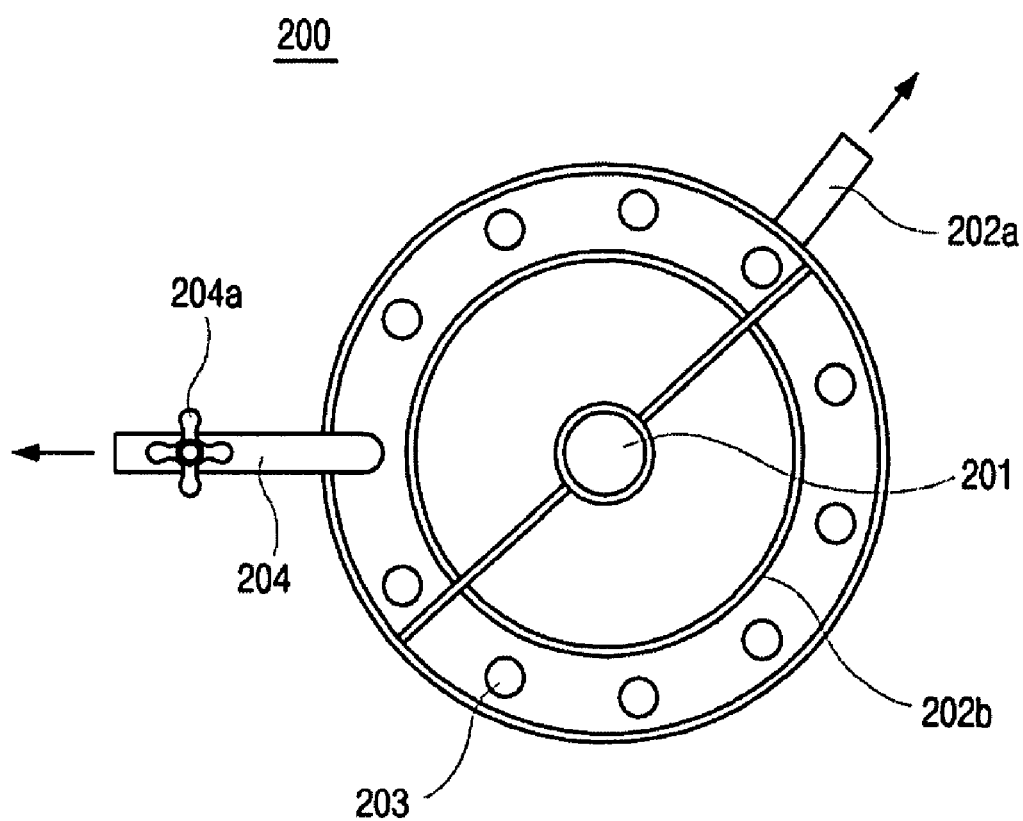
FIG. 7 is a plan view of FIG. 6.
Figure 8:
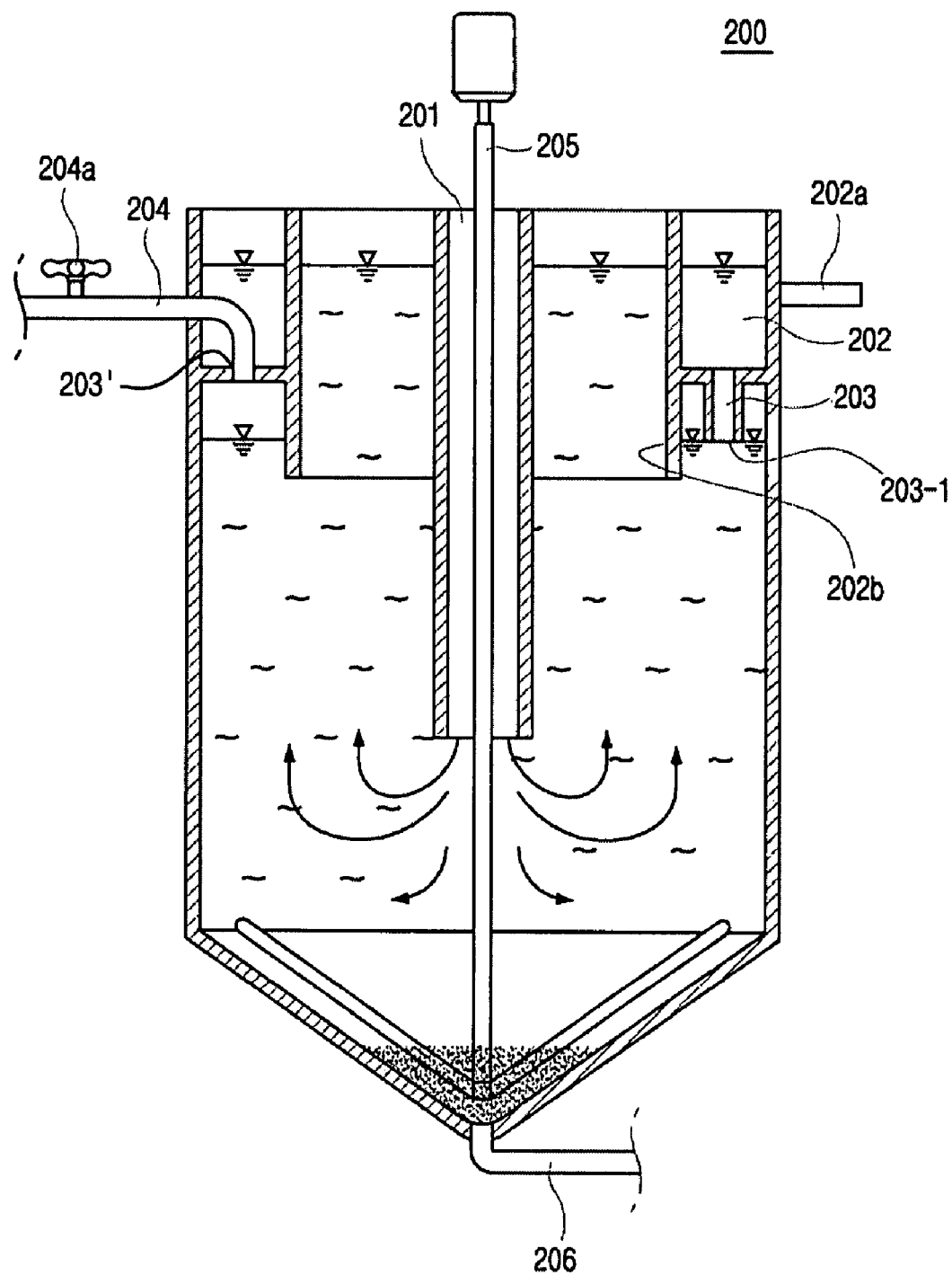
FIG. 8 is a side view illustrating an operation state when a valve is closed in the precipitation tank of FIG. 6.

As depicted in FIGS. 6 to 8, the precipitation tank 200 in which the precipitation separation process is made comprises an inlet pipe 201 for introducing sludge from the upper outside portion to the lower portion of the inside of a main body, a wear 202 having a predetermined width and depth and dividing the internal space of the main body along the edge of the upper portion, and a plurality of transfer pipes 203 protruding downward and through-holes 203' spaced at regular intervals for connecting the bottom surface of the wear 202 to the internal space of the main body.

Moreover, the precipitation tank 200 further comprises a scum discharge pipe 204, opened and closed by a valve 204a to discharge gas and scum filled in the vicinity of transfer pipes 203 of the wear 202, formed on the outer wall of the wear 202 to be connected to the through-holes 203', a supernatant discharge pipe 202a formed on one side of the upper portion of the wear 202 to discharge supernatant filled in the wear 202, a partition 202b having a predetermined length from the bottom surface of the inner wall of the wear 202 to the lower portion, and a sludge discharge pipe 206 provided on the bottom of the main body thereof to discharge sludge to the outside.

Figure 9:
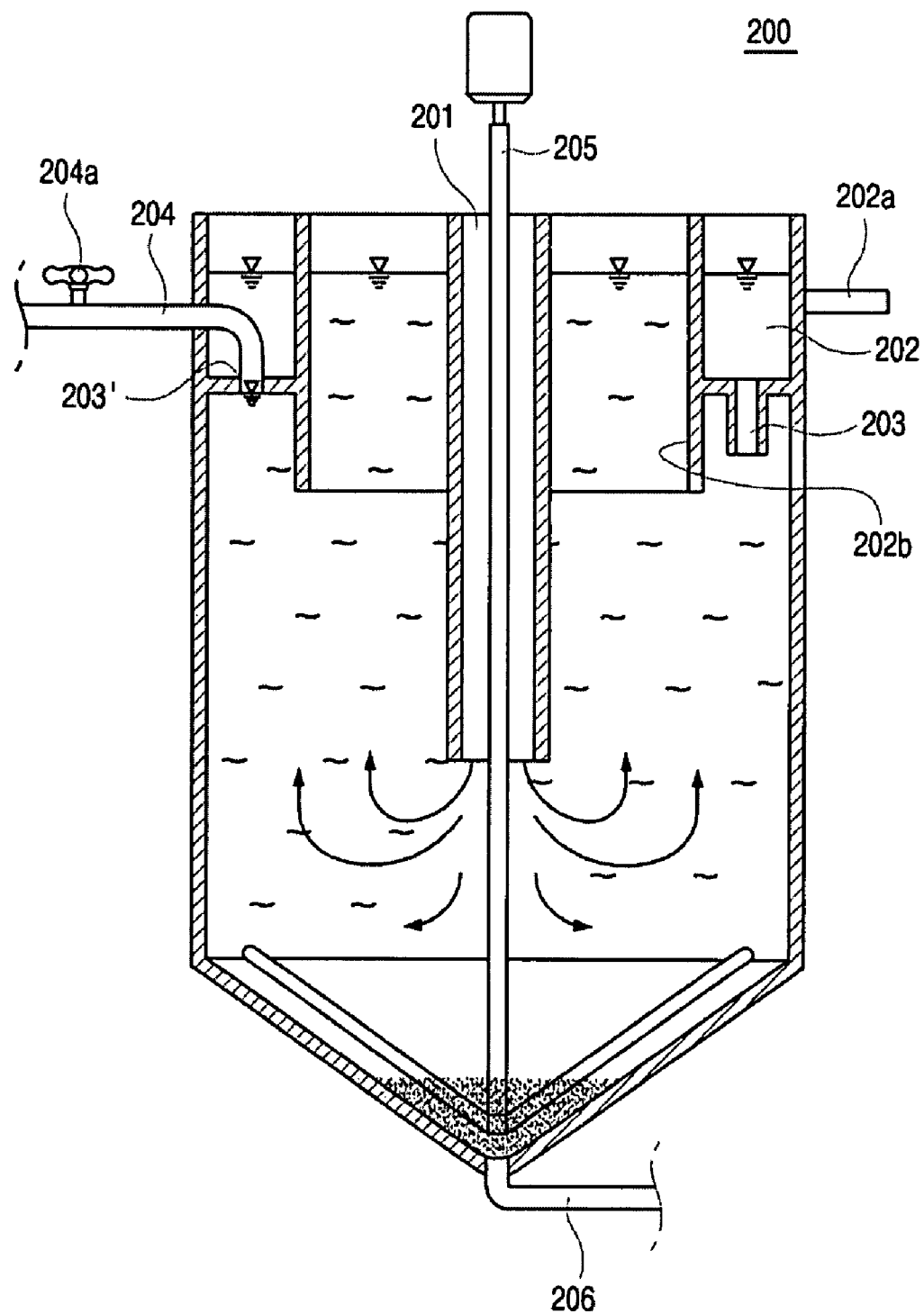
FIG. 9 is a side view illustrating an operation state when a valve is opened in the precipitation tank of FIG. 6.

The precipitation separation operation of sludge by the precipitation tank 200 will be described with reference to FIGS. 8 and 9.

Sludge introduced into the precipitation tank 200 through the inlet pipe 201 is settled downward and supernatant is moved toward the water level in the internal space of the precipitation tank 200. Here, the settled sludge is discharged to the outside through the sludge discharge pipe 206 by the operation of an ordinary scrubber 205.

In the precipitation tank 200 having the above-described structure, while the water contained in the sludge introduced into the main body through the inlet pipe 201 is moved toward the water level, the movement of the water does not depend on a local fluid movement but maintains a fluid flow of the whole internal space of the precipitation tank 200. Accordingly, the flow rate of the fluid in the upper direction becomes slow.

That is, while the water in the upper portion is discharged through the wear 202, a continuous flow of water is shut by the partition 202b before the water flows into the transfer pipes 203. Accordingly, the water is not introduced from the lower portion but from the surface of the water into the transfer pipes 203 and then moved into the wear 202.

Accordingly, a so-called "channel phenomenon" in which water flows from the inside of the precipitation tank 200 to the surface of the water is shut and the flow rate of the water becomes very slow, thus increasing precipitation efficiency remarkably.

Moreover, supernatant is separated from scum due to instantaneous surface tension just before the supernatant is introduced into the transfer pipes 203, and the supernatant in the uppermost layer is first moved into the wear 202 and then discharged to the outside through the supernatant discharge pipe 202a. If the amount of scum filled in the wear 202 is large, the scum may be discharged to the outside through a separate scum discharge pipe 204.

In this process, since the supernatant is moved upward through the transfer pipes 203, the scum lighter than water adjacent to the transfer pipes 203 is not discharged upward through the transfer pipes 203 but remains in the water level 203-1 adjacent to the transfer pipes 203 as depicted in FIG. 8. Moreover, in the vicinity of the through-holes 203' which is not connected to the transfer pipe, gas, scum and water are discharged in the sequential order through the scum discharge pipe 204.

The scum discharge pipe 204 is used for discharging the scum accumulated in the vicinity of the through-holes 203'. In this process, if the air, i.e., the lightest material, is all discharged, the water surface is not formed. Accordingly, air is injected in a state where an air injection device such as an external compressor is connected to the scum discharge pipe 204 until the injected air is discharged through the other transfer pipes 203 and then the valve 204a is closed.

The supernatant and scum may be discharged either by natural flow or forced drainage using a pump. The treated water purified through the above-described process can be discharged to the outside.

In the present invention, the inflow or outflow water may be introduced into the lower, upper or middle portion of the reactor and the gas is introduced from the lower portion of the reactor.

While the present invention is to treat any organic wastewater, the present invention was applied to the treatment of food wastewater, in which the temperature of the reactor was set variously such as a middle temperature of 35° C., a high temperature of 55° C., etc., and the results shown in the following table were obtained.

| Classification | Raw water (BOD, mg/L) | Treated water (BOD, mg/L) | Treatment time (d) |
|---|---|---|---|
| Food wastewater Middle temperature Anaerobic treatment | 70,000 to 120,000 | 1,500 to 10,000 | 2 to 7 |
| Food wastewater Middle/high temperature Aerobic treatment | 70,000 to 120,000 | 50 to 500 | 2 to 5 |
| Food wastewater Aerobic treatment After anaerobic treatment | 1,500 to 30,000 | 30 to 100 | 1 to 3 |

As described above, the apparatus and method in accordance with the preferred embodiment of the present invention have the several advantages as follows:

First, it is possible to effectively treat high concentration wastewater by sequentially performing an aerobic treatment process and an anaerobic treatment process;

Second, it is possible to approximate a plug flow reactor in which introduced raw wastewater and gas are gradually moved by arranging sludge separating means of multi-stages in the reactor to naturally form gas staying spaces in the reactor;

Third, it is possible to detain relatively high density materials (microorganisms) in the lower portion of the reactor, thus ensuring microorganisms in the reactor;

Fourth, it is possible to maximize vapor-liquid contact efficiency and mixing efficiency by increasing the fluidity; and Last, it is possible to effectively use the high activity of microorganisms and the reaction heat generated by the rapid growth of microorganisms in the reactor.

As above, preferred embodiments of the present invention have been described and illustrated, however, the present invention is not limited thereto, rather, it should be understood that various modifications and variations of the present invention 10 can be made thereto by those skilled in the art without departing from the spirit and the technical scope of the present invention as defined by the appended claims.

We claim:

1. A method for treating wastewater comprising:
   a pre-treatment step of removing impurities contained in high concentration wastewater and crushing the impurities using a crusher;
   a first aerobic treatment step of supplying wastewater containing organic acids to a first aerobic tank and injecting air to the first aerobic tank to be aerobically treated;
   an anaerobic treatment step of supplying the wastewater, from which excess organic acids are removed by the aerobic treatment, to an anaerobic tank to be anaerobically treated;
   a degassing step of supplying the wastewater treated in the aerobic and anaerobic treatment steps to a degassing tank to remove air and gas; and
   a post-treatment step of precipitating the wastewater aerobically treated using a solid-liquid separation tank, a pressure floatation tank or a precipitation tank; and
   a second aerobic treatment step of repeatedly treating the degassed wastewater in a second aerobic tank after the degassing step.

2. The method of claim 1, wherein each of the first aerobic tank comprises: a wastewater inlet pipe; a gas discharge pipe; a treated water discharge pipe; a reactor into which wastewater and air are introduced by a diffuser; sludge separating means increasing a contact area between wastewater and bubbles to increase dissolved oxygen concentration by dividing the inside of the reactor into up and down multi-stages and separating pollutants according to their concentrations by precipitating sludge using a difference in rise rates of bubbles; and a settling tank, provided on the lower portion of the reaction, for concentrating and discharging precipitated sludge.

3. The method of any one of claims 2, wherein the sludge separating means includes first to third sludge separating means, each of the first to third sludge means comprising: a plate, on which a plurality of through-holes is formed, for dividing the inside of the reactor into up and down regions; and a plurality of fluid transfer pipes, protruding downward from the bottom of the plate to form staying spaces for collecting gas, through which wastewater and air pass, and degrading pollutants by precipitating sludge using a difference in rise rates of bubbles passing through the fluid transfer pipes to increase the concentration of microorganisms, if the introduced gas and wastewater ascend to reach the sludge separating means.

4. The method of claim 3, wherein the plurality of fluid transfer pipes includes at least one selected from the group consisting of a shape of which the upper area is smaller in diameter than the lower area, a shape of which the upper area is greater than the lower area, and a shape of which the upper and lower areas are the same.

5. The method of claim 2, wherein a heat exchanger, to which heat generated from microorganisms is transferred, is further included on the outer surface of the reactor.

6. The method of claim 1, wherein the anaerobic tank comprises: a wastewater inlet pipe; a gas discharge pipe; a treated water discharge pipe; a reactor into which wastewater and air are introduced by a diffuser; sludge separating means increasing a contact area between wastewater and bubbles to increase dissolved oxygen concentration by dividing the inside of the reactor into up and down multi-stages and separating pollutants according to their concentrations by precipitating sludge using a difference in rise rates of bubbles; a settling tank, provided on the lower portion of the reaction, for concentrating and discharging precipitated sludge; and first and second gas transfer pipes, provided on both sides of the reactor, for circulating gas up and down by discharging the gas in the reactor.

7. The method of claim 6, wherein the first gas transfer pipe comprises a first main pipe through which gas is transferred, first auxiliary pipes protruding from the first main pipe to the inside of the reactor and connected to staying spaces of the respective sludge separating means, and a solenoid valve provided in the first main pipe.

8. The method of claim 6, wherein the second gas transfer pipe comprises a second main pipe through which gas is transferred, second auxiliary pipes protruding from the second main pipe to the inside of the reactor and connected to staying spaces of the respective sludge separating means, a pump forcing the gas to circulate, and a valve, provided in the second main pipe, for preventing wastewater from flowing backward.

9. The method of claim 8, wherein the lower end portion of the second main pipe is connected to the air inlet pipe to mix circulated gas and air.

10. The method of claim 6, wherein the uppermost water level of the reactor is set lower than the height of the treated water discharge pipe.

11. The method of claim 6, wherein a heat exchanger, to which heat generated by microorganisms is transferred, is further included on the outer surface of the reactor.

12. The method of claim 1, wherein the degassing tank comprises: a wastewater inlet pipe; a gas discharge pipe; a treated water discharge pipe; a reactor into which wastewater and air are introduced by a diffuser; sludge separating means increasing a contact area between wastewater and bubbles to increase dissolved oxygen concentration by dividing the inside of the reactor into up and down multi-stages and separating pollutants according to their concentrations by precipitating sludge using a difference in rise rates of bubbles; a settling tank, provided on the lower portion of the reaction, for concentrating and discharging precipitated sludge; first and second gas transfer pipes, provided on both sides of the reactor, for circulating gas up and down by discharging the gas in the reactor; and a diffuser, provided in the lower portion of the reactor, for injecting air.

13. The method of claim 12, wherein the diffuser comprises an air inlet pipe, a ventilator provided on one end of the air inlet pipe, and a nozzle provided in the other end of the air inlet pipe and extending to the inside of the reactor.

* * * * *